United States Patent [19]
Bois et al.

[11] Patent Number: 4,930,609
[45] Date of Patent: Jun. 5, 1990

[54] GEARSHIFT LEVER INTERLOCK

[75] Inventors: Wilhelm Bois, Gaimersheim; Franz Amberger, Neuenhinzenhausen; Josef Buchl, Lenting, all of Fed. Rep. of Germany

[73] Assignee: Audi AG, Ingolstadt, Fed. Rep. of Germany

[21] Appl. No.: 336,023

[22] Filed: Apr. 11, 1989

[30] Foreign Application Priority Data

Apr. 22, 1988 [DE] Fed. Rep. of Germany ....... 3813653

[51] Int. Cl.⁵ ........................ B60K 41/26; G05G 5/10
[52] U.S. Cl. .................................. 192/4 A; 74/483 R
[58] Field of Search ......... 192/4 A; 74/473 R, 483 R, 74/878

[56] References Cited

U.S. PATENT DOCUMENTS

| 3,942,614 | 3/1976 | Thompson | 74/483 R X |
| 4,187,935 | 2/1980 | O'Hern | 192/4 A |
| 4,473,141 | 9/1984 | Mochida | 192/4 A X |

FOREIGN PATENT DOCUMENTS 246353 11/1987 European Pat. Off. ............ 180/336

Primary Examiner—Allan D. Herrmann
Attorney, Agent, or Firm—Lalos & Keegan

[57] ABSTRACT

A gearshift lever interlock is provided that allows movement of the gearshift lever of an automatic transmission from the neutral or park positions only if the brake pedal is actuated. The improved locking device locks the gearshift lever in the park position in the event of a malfunctioning electrical locking system but will not lock the gearshift lever in the neutral position. A mechanical release is provided to override the electrical gearshift lever interlock sytem.

7 Claims, 2 Drawing Sheets

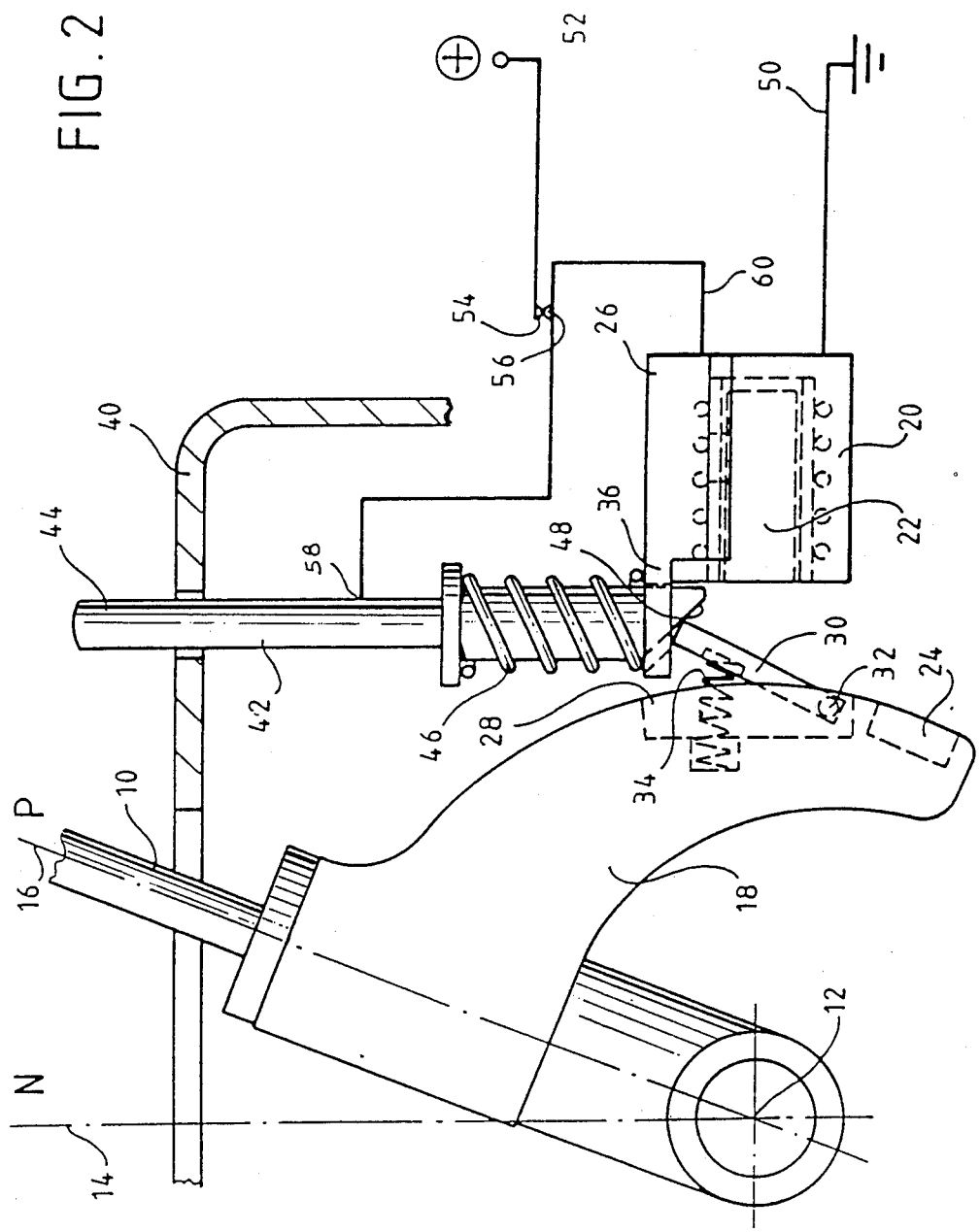

GEARSHIFT LEVER INTERLOCK

BACKGROUND OF THE INVENTION

This invention relates generally to a gearshift lever for automatic transmissions and more particularly to a locking device for gearshift levers that are moved through a series of positions to effect different operating and drive conditions of the automatic transmission.

The problem occurring in automobiles with automatic transmissions is the inadvertent movement of the car resulting from a driver changing the gearshift lever from the park or neutral positions to a drive position while inadvertently stepping on the gas pedal rather than the intended action of stepping on the brake pedal. It is thus desirable to provide a lockable gearshift lever in automatic transmissions that requires the driver to keep his foot on the brake pedal in order to move the gearshift lever from the park or neutral positions into a driving position.

Gearshift lever interlocks have previously been disclosed, see for example European Patent Application No. 86110975.9, publication no. 246,353. Such locking devices operate to keep the gearshift or gear selector level of an automatic transmission locked in the park (P) and neutral (N) positions, releasing the selector level only if the brake pedal is depressed or actuated. Actuation of the brake pedal energizes an electrically controlled circuit that unlocks the selector level permitting it to be shifted into one of the drive positions. The gearshift level interlock ensures that the driver is forced to locate and depress the brake pedal before placing the car in gear. This greatly reduces the possibility that the driver will mistake the accelerator pedal for the brake pedal.

In addition to controlling movement of the gearshift lever out of the park or neutral positions when the ignition is on and the motor is running, it is also desirable to control movement of the gearshift lever when the ignition is off. If the motor is not running, the car may move forward or backward if it is on an inclined surface when the gearshift lever is moved out of the park or neutral positions. Thus, it is preferable for the locking device to be operable in the locking position with the electrically controlled locking device in the deenergized state, i.e. without power. Thus, if the electrically controlled locking device is not energized, it will be engaged and the gear selector lever cannot be moved from the park position.

A disadvantage of a locking device that must be electrically activated to release the gearshift lever is that if power being supplied to the electrically controlled locking device is interrupted the vehicle can no longer be moved. This disadvantage presents a particular problem if during operation of the vehicle the gearshift lever becomes locked in the neutral position. This situation may arise if, for example, the vehicle is to be backed up and the gearshift lever is moved from one of the drive positions through neutral and into reverse. If power to the locking device is interrupted and cannot be electrically disabled, the car would be locked in neutral when the gearshift lever is passed through this position.

An alternative method for locking the gearshift lever is to provide an electrically activated locking device that locks the lever in response to a continuous electrical signal and unlocks the lever when electrical power is removed. However such a method is not effective when the ignition is off because the electrical power of the battery is insufficient to meet the power consumption needs of the electrical locking device.

It is therefore an object of the present invention to provide a locking device for the gearshift lever of an automatic transmission that effectively locks the gearshift lever in the park and neutral positions, that consumes a minimum of electric power, and that is operable even if the power to the electrically controlled locking device is interrupted. In summary, the locking device of the present invention is configured such that the gearshift lever is unlocked from the park (P) position when electrical power is supplied to the locking device, while the gearshift lever is unlocked from the neutral (N) position when electrical power is removed from the locking device. The present invention utilizes a conventional control unit, described for example in the previously mentioned European Patent Application No. 86110975.9, that monitors contacts associated with the N and P positions and the brake pedal. If the brake pedal is actuated or depressed, the control unit causes the locking device to be electrically energized to release the gearshift lever when it is in the P position and the control unit operates to remove electrical power from the locking device to release the gearshift lever from the N position. Any simple electrical circuit or control unit such as that described in the above mentioned European patent application is suitable for the present invention. It does not form an important aspect of the present invention and is not described in any detail herein.

The locking device of the present invention can comprise, for example, a pin that can be introduced into the path of movement of the gearshift lever. An electromagnet can be utilized, for example, to move the pin into an extended position in the path of the gearshift lever and a withdrawn position out of the path of the gearshift lever. The extended position can be effected by electrically energizing the electromagnet.

In one embodiment, when the gearshift lever is in the N position an opening in the interlock element of the locking device is aligned with the pin of the electromagnet. If the pin is extended, the lever is locked in the N position. If the pin is permanently withdrawn in the event of an inoperable electromagnet or due to power interruption, it cannot be introduced into the opening of the interlock element and thus the gearshift lever cannot be locked in the N position.

Extension of the pin of the electromagnet has an opposite effect on the gearshift lever when in the P position. When in the P position, the gearshift lever is locked by means of a catch which comes to rest against a corresponding stop. When the brake pedal is actuated, the pin is moved to its extended position out of the electromagnet displacing the catch and moving it into a position which is not in contact with the stop. The gearshift lever can then be moved out of the P position.

As a backup to the electromagnet, i.e. in case of an electromagnet malfunction, a manually operable unlocking device may be provided to displace the catch and permit the gearshift lever to be moved from the P position. If the electromagnet is not functioning or cannot be energized and the pin remains retracted, the gearshift lever will not be locked in the N position and can be unlocked from the P position by means of the manual unlocking device. Further, in order to prevent the electromagnet from being continually energized with its pin extended and locking the gearshift lever in the N position, the manually operable unlocking device can be devised to interrupt power to the electromagnet thereby releasing the gearshift lever from the N position. If the manually operated device for interrupting power to the electromagnet is designed as a temporary or intermittent pushbutton, then the manual unlocking device must be actuated each time the lever is returned to the N position, assuming that the electromagnet is constantly energized. As an alternate arrangement, the manual unlocking device may be designed to permanently disable power supply to the electromagnet. However, this will prevent the brake-dependent gearshift lever interlock system from being operable in the N position.

BRIEF DESCRIPTION OF THE DRAWINGS

FIG. 2 is a side view of the gearshift lever interlock shown in FIG. 1 and including a view of the manual unlocking device and the power supply inputs to the electromagnet of the present invention.

DETAILED DESCRIPTION

Figure 1:
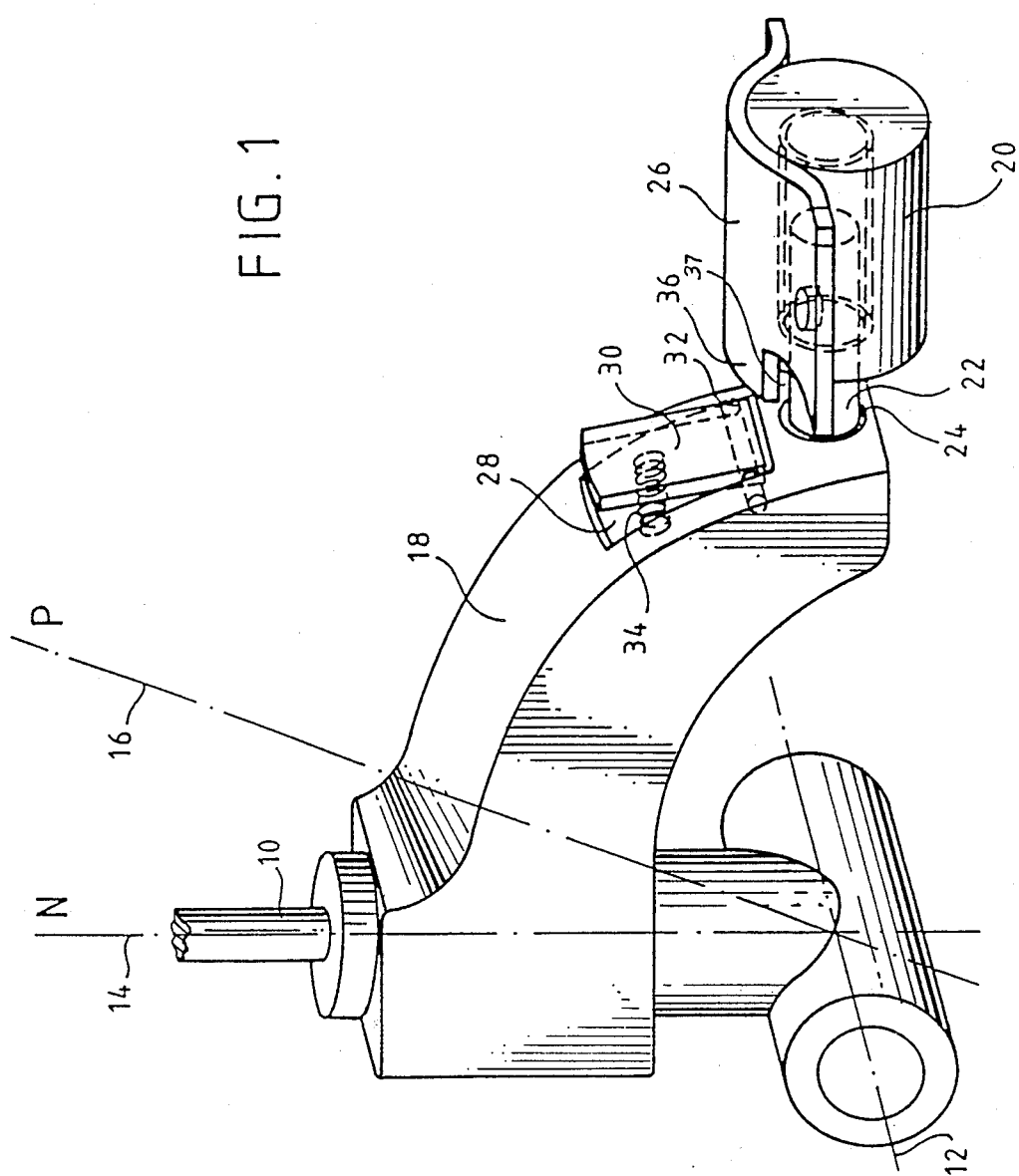
FIG. 1 is a perspective view of the gearshift lever interlock device the present invention.

FIG. 1 illustrates a conventional gearshift lever 10 for an automatic transmission. Gearshift lever 10 is rotatable about an axis 12. As is conventional, the gear selected in the automatic transmission is determined by the degree of inclination of gearshift lever 10. In FIG. 1, gearshift lever 10 is illustrated as occupying the N or neutral position designated by reference number 14. In FIG. 2, gearshift lever 10 is shown as occupying the P or park position designated by reference number 16.

As illustrated in both figures, an extension piece or interlock element 18 extends from gearshift lever 10 and is moved as the gearshift lever 10 is moved. As the gearshift lever 10 is moved through various positions, the interlock element 18 is moved past electromagnet 20. As best illustrated in FIG. 1, when electromagnet 20 is energized it extends a pin 22. When the gearshift lever is in the N position the extended pin 22 is introduced into an opening 24 of interlock element 18. As a result, movement of interlock element 18 is prevented as is movement of gearshift lever 10.

As best illustrated in FIG. 2, when the gearshift lever 10 is in the P or park position 16 it is locked in place by means of catch or plate 30. Plate 30 pivots about pin 32 and is extended by spring 34 into the position shown in FIG. 2 or can be pushed into recess 28 as will be explained later. Electromagnet 20 is provided with a mounting strip 26 one end of which includes a projection 36 including an opening 37 (as best illustrated in FIG. 1).

Referring to FIG. 2, when gearshift lever 10 is in the P position 16, plate 30 is forced forward by spring 34 and engages projection 36 as a stop. This prevents gearshift lever 10 from being moved back from the forwardmost position (i.e. the park position) because the pressure of plate 30 against projection 36 blocks movement of the interlock element 18. When electromagnet 20 is energized, pin 22 is extended out from electromagnet 20 forcing plate 30 against the pressure of spring 34 back into recess 28. Interlock element 18 and attached gearshift lever 10 can now be moved because plate 30 is no longer caught by projection 36.

In operation of an automobile, gearshift lever 10 will initially be in the park position. It cannot be moved from this position because of plate 30 pressing against projection 36. Once the ignition is switched on and the brake is stepped on or actuated, electromagnet 20 is energized through a conventional control circuit. Energizing electromagnet 20 causes pin 22 to be extended pressing against plate 30 forcing it into recess 28 and away from projection 36. The gearshift lever 10 can now pivot and be moved out of the park position. During subsequent operation, the gearshift lever 10 is locked when it reaches the N position 14 through energization of the electromagnet 20. Again, as is conventional, appropriate electrical contacts are associated with the N position. In the present invention, a conventional control circuit operates to energize the electromagnet when the gearshift lever is in the N position causing pin 22 to be extended. Pin 22 enters the opening 24 of interlock element 18 so that further movement of the gearshift lever 10 is prevented. As an alternative, a time delay can be introduced into the control circuit in a conventional manner so that the pin is extended only if the gearshift lever is left in the N position for a specific, predetermined time, e.g. for a period of one second or longer. As a further alternative, a conventional logic element can be included with the control circuit so that the pin is extended only when the vehicle is stationary or nearly stationary. Supply of current to electromagnet 20 when the gearshift lever is in the N position is continuous until the brake pedal is activated. Activating the brake pedal disables the current supply to the electromagnet which deenergizes the electromagnet and withdraws pin 22 from opening 24. Gearshift lever 10 can then be moved again.

If electromagnet 20 is disabled, for example if a broken wire prevents it from being energized, the gearshift lever will not be locked in the N position. In this situation the gearshift lever operates as it would in a standard automatic transmission without a gearshift lever interlock device.

However, if electromagnet 20 is disabled and the gearshift lever is in the park position it cannot be moved because electromagnet 20 is no longer capable of forcing plate 30 back into recess 28. In order to alleviate this problem, a manually operable release is provided. This manual release comprises a pin 42 which projects through a cover 40 and the upper end of which terminates in an actuating button 44. The lower end of pin 42 is loaded by a spring 46 and has a beveled surface at its lowermost end 48 extending through opening 37 of projection 36. If pin 4 is forced downward by pressure on button 44 against the action of spring 46, the beveled surface 48 slides over plate 30 forcing plate 30 into recess 28. Gearshift lever 10 can then be moved from the park position 16.

Referring to FIG. 2, electromagnet 20 is grounded through connection 50. The positive voltage is supplied to electromagnet 20 through connection 52 and a pair of contacts 54 and 56, and connection 60. Pin 42 is mechanically connected at 58 to contact 56. As a result, depression of button 44 moves contact 56 away from contact 54 thus interrupting the application of voltage to electromagnet 20. Thus in the event that electromagnet 20 is erroneously supplied with continuous electric power to energize electromagnet 20 and extend pin 22, button 44 can be depressed to disable the power supply thereby deenergizing electromagnet 20 and withdrawing pin 22 to permit the gearshift lever 10 from being moved out of the N position.

When the manually operable button 44 is released, contacts 54 and 56 will again be closed. If continuous power is erroneously supplied to electromagnet 20 and the gearshift lever is moved back to the N position, it will be locked in place until button 44 is pressed again. As an alternative, the pair of contacts 54 and 56 may be kept open after a single depression of button 44, as for example by use of a dead center spring. This will prevent gearshift lever 10 from being locked in the N position again. However, this alternative effectively disables the shift lever interlock and inadvertent depression of button 44 will defeat the purpose of the interlock system.

From the foregoing description, it will be evident to those having ordinary skill in the art that additional alternatives and embodiments can be made without departing from the spirit and scope of the invention as defined in the claims.

We claim:

1. An interlock for a gearshift lever of an automatic transmission of a vehicle, the gearshift lever being movable through a series of positions including a park position and a neutral position, the interlock comprising an interlock element attached to said gearshift lever and movable in a predetermined path with the movement of said gearshift lever, an electrically controlled device including a moving means displaceable toward said interlock element upon energization of said electrically controlled device, said interlock element comprising a first locking means for engagement with said moving means to unlock the gearshift lever from the park position and a second locking means for engagement with said moving means to lock the gearshift lever in the neutral position, wherein said electrically controlled device is deenergized to displace said moving means away from said interlock element thereby disengaging from said first locking means to lock said gearshift lever when in the park position and disengaging from said second locking means to unlock said gearshift lever when in the neutral position, and wherein said moving means is a pin extendable from said electrically controlled device when said device is energized, and said first locking means includes a catch which rests against a stop when said gearshift lever is in the park position and which can be displaced from said stop by said pin when extended.

2. A gearshift lever interlock as in claim 1 wherein said electrically controlled device is an electromagnet.

3. A gearshift lever interlock as in claim 2 wherein said second locking means is an opening in said interlock element for receiving said pin when extended.

4. A gearshift interlock as in claim 1 further including a manual unlocking device for unlocking said first locking means.

5. A gearshift interlock as in claim 4 wherein said manual unlocking device includes a manually movable pin for displacing said catch from said stop.

6. A gearshift interlock as in claim 4 wherein said manual unlocking device includes means for interrupting a supply of power to said electrically controlled device when said manual unlocking device is actuated.

7. A gearshift interlock as in claim 6 wherein said supply of power to said electrically controlled device remains interrupted after said manual unlocking device is actuated.

* * * * *